(12) United States Patent
Beeston et al.

(10) Patent No.: US 7,664,995 B2
(45) Date of Patent: Feb. 16, 2010

(54) TRANSFER OF APPLICATION LOGGIN STATUS INFORMATION ACROSS SUBSYSTEM NODES

(75) Inventors: Ralph Thomas Beeston, Tucson, AZ (US); Thomas William Bish, Tucson, AZ (US); Joseph Whitney Dain, Tucson, AZ (US); Henry Z. Liu, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 11/461,330

(22) Filed: Jul. 31, 2006

(65) Prior Publication Data

US 2008/0126469 A1  May 29, 2008

(51) Int. Cl.
  *G06F 11/00* (2006.01)
(52) U.S. Cl. .................. 714/48; 709/223; 709/224; 707/202
(58) Field of Classification Search ............ 714/18, 714/48; 709/224, 223; 707/200–204
  See application file for complete search history.

(56) References Cited

U.S. PATENT DOCUMENTS

| | | | |
|---|---|---|---|
| 5,740,432 A * | 4/1998 | Mastors ............ | 707/202 |
| 6,347,335 B1 * | 2/2002 | Shagam et al. ............ | 709/223 |
| 6,681,349 B2 | 1/2004 | Sekizawa | |
| 7,275,104 B1 * | 9/2007 | Martinez et al. ............ | 709/224 |
| 2003/0097464 A1 * | 5/2003 | Martinez et al. ............ | 709/238 |
| 2006/0167955 A1 * | 7/2006 | Vertes ............ | 707/201 |
| 2007/0083641 A1 * | 4/2007 | Hu et al. ............ | 709/224 |

FOREIGN PATENT DOCUMENTS

EP    1225752 A2    7/2002

OTHER PUBLICATIONS

"BEA WebLogic Server—Using WebLogic Logging Services for Appication Logging." by BEA Systems. copyright 2005.*
"BEA WebLogic Server—Configuring Log Files and Filtering Log Messages." by BEA Systems. copyright 2005.*

* cited by examiner

*Primary Examiner*—Philip Guyton
(74) *Attorney, Agent, or Firm*—David W. Victor; Konrad Raynes & Victor LLP

(57) ABSTRACT

In a system including an application subsystem node having an application RSID table and a logging subsystem node having a logging RSID table, the application subsystem node makes a determination of a registration status of a ALSI string relative to the application RSID table during a logging operation of the ALSI string. The application subsystem node further transfers a RSID package from the application subsystem node across a network to the logging subsystem node, wherein the RSID package includes a RSID encoding of the ALSI string and conditionally includes the ALSI string based on the registration status of the ALIS string relative to the application RSID table as determined by the application subsystem node.

21 Claims, 7 Drawing Sheets

RSID TABLE
70

| ENTRY | RSID ENCODING | APPLICATION LOGGING STATUS INFORMATION STRING |
|---|---|---|
| 1 | RSID #1 | ALSI #1 |
| 2 | RSID #2 | ALSI #2 |
| 3 | RSID #3 | ALSI #3 |
| ⋮ | ⋮ | ⋮ |
| k | RSID #k | ALSI #k |

FIG. 2

TRANSFER OF APPLICATION LOGGIN STATUS INFORMATION ACROSS SUBSYSTEM NODES

FIELD OF THE INVENTION

The present invention generally relates to methods for transferring application logging status information across multiple subsystem nodes for purposes of system support. The present invention specifically relates to an optimal method for efficiently transferring application logging status information across subsystem nodes, particularly across Virtual Tape Server subsystem nodes or Virtual Optical subsystem nodes.

BACKGROUND OF THE INVENTION

A system application can generate application logging status information useful to application developers, product engineers and the like in debugging problems with the system application. Examples of such application logging status information include, but is not limited to, information regarding failures, degraded conditions and timeouts of the application. Sufficient logging of all status information of the system application is essential for a system support structure to understand certain systems failures/degraded conditions related to the system application. As such, it has become common practice for application developers to log an excessive amount of application status information to facilitate the system support structure in quickly understanding details of system failures/degraded conditions and in urgently resolving any problems to minimize system outages.

Nonetheless, an "un-optimized" application logging method may greatly diminish a system's performance as application logging is accomplished at the cost of system resources, especially if the method involves a transfer of a complete description of the application logging status information across network nodes. The computer industry therefore is continually striving to develop "optimized" logging methods that benefit not only the system support structure, but also the performance of the system.

SUMMARY OF THE INVENTION

In a system including a plurality of subsystem nodes in the form of one or more application subsystem nodes and one or more logging subsystem nodes, the present invention provides a new and unique application logging status information transfer across the subsystem nodes (e.g., a Virtual Tape Server system or a Virtual Optical system).

One form of the present invention is a method of operating a system including an application subsystem node having an application RSID table and a logging subsystem node having a logging RSID table, the method involving application subsystem node determining a registration status of a ALSI string relative to the application RSID table, and transferring a RSID package across a network to the logging subsystem node, wherein the RSID package includes an RSID encoding of the ALSI string and conditionally includes the ALSI string based on the registration status of the ALIS string relative to the application RSID table.

A second form of the present invention is a system including an application subsystem node and a logging subsystem node. The application subsystem node includes a processor and a memory operable with the processor for executing instructions for determining a registration status of a ALSI string relative to an application RSID table, and for transferring a RSID package across a network to the logging subsystem node, wherein the RSID package includes an RSID encoding of the ALSI string and conditionally includes the ALSI string based on the registration status of the ALIS string relative to the application RSID table.

A third form of the present invention is an application subsystem node including a logging agent and an application RSID table, and a logging subsystem node including a system logging utility and a logging RSID table. The logging agent operates to determining a registration status of a ALSI string relative to the application RSID table, and to transfer a RSID package across a network to the logging subsystem node, wherein the RSID package includes an RSID encoding of the ALSI string and conditionally includes the ALSI string based on the registration status of the ALIS string relative to the application RSID table.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 2 illustrates one embodiment of a RSID table in accordance with the present invention;

DETAILED DESCRIPTION OF THE PRESENT INVENTION

Figure 1:
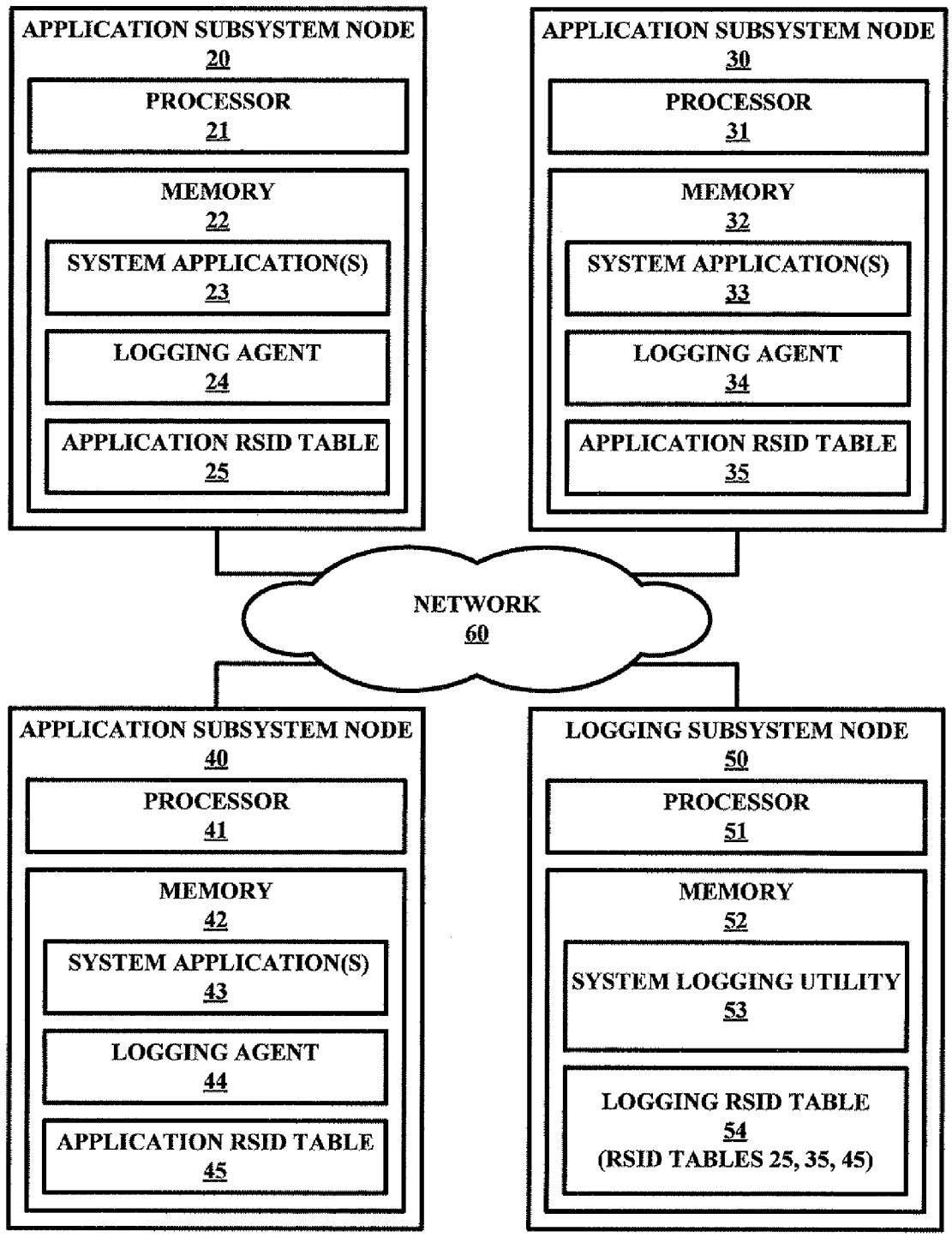
FIG. 1 illustrates one embodiment of subsystem nodes in accordance with the present invention.

FIG. 1 illustrates an exemplary system of the present invention employing an application subsystem node 20, an application subsystem node 30, an application subsystem node 40, and a logging subsystem node 50 connected via a network 60 (e.g. a local area network). For purposes of the present invention, the term "application subsystem node" is broadly defined herein as a subsystem node for executing one or more system applications and the term "logging subsystem node" is broadly defined herein as a subsystem node for executing a system logging utility on behalf of the system applications. As such, each subsystem node 20, 30, 40, 50 can serve as an application subsystem node for purposes of executing assigned system applications and/or as a logging subsystem node for purposes of executing logging operations related to system applications performed by the other subsystems nodes. Nonetheless, for purposes of understanding the various inventive principles of the present invention, subsystem nodes 20, 30 and 40 will be described herein in the capacity of application subsystem nodes for executing assigned applications and subsystem node 50 will be described herein in the capacity of a logging subsystem node for executing a system logging utility on behalf of the system applications executed by application subsystem nodes 20, 30, 40.

To this end, application subsystem node 20 includes a processor 21 and a memory 22 storing one or more assigned system application(s) 23, a logging agent 24, and a Reduced String Identification ("RSID") table 25 listing RSID encodings associated with application logging status information strings of system application(s) 23. Application subsystem node 30 includes a processor 31 and a memory 32 storing one or more assigned system application(s) 33, a logging agent 34, and a RSID table 35 listing RSID encodings associated with application logging status information strings of system application(s) 33. Application subsystem node 40 includes a processor 41 and a memory 42 storing one or more assigned system application(s) 43, a logging agent 44, and a RSID table 45 listing RSID encodings associated with application logging status information strings of system application(s) 43. And, logging subsystem node 50 includes a processor 51 and a memory 52 storing a system logging utility 53 and a RSID table 54 composed of RSID tables 25, 35, 45, segregated or integrated in whole or in part.

Generally, for purposes of the present invention, the term "RSID encoding" is broadly defined herein as an encoded representation of an application logging status information string that has a reduced data size for purposes of facilitating an optimal transfer of that particular application logging status information string from a corresponding application subsystem node across a network to a logging subsystem node. For example, as illustrated in FIG. 2, a RSID table 70 serving as model for RSID tables 25, 35 45 includes a k listing of RSID encodings of application logging status information strings where each RSID encoding is an encoded representation of an application logging status information string that has a reduced data size for purposes of facilitating an optimal transfer of that particular application logging status information string from a corresponding application subsystem node across a network to a logging subsystem node.

The present invention does not impose any limitations or restrictions as to the data size and format of a RSID encoding, particularly in view of the variable nature of application logging status information strings. In one embodiment, a RSID encoding includes four (4) bytes in hexadecimal format whereby each byte can be further indicative of another aspect of application logging status information such as, for example, a particular type of log information included within the application logging status information or a particular function or functions of the corresponding system application.

Figure 3:
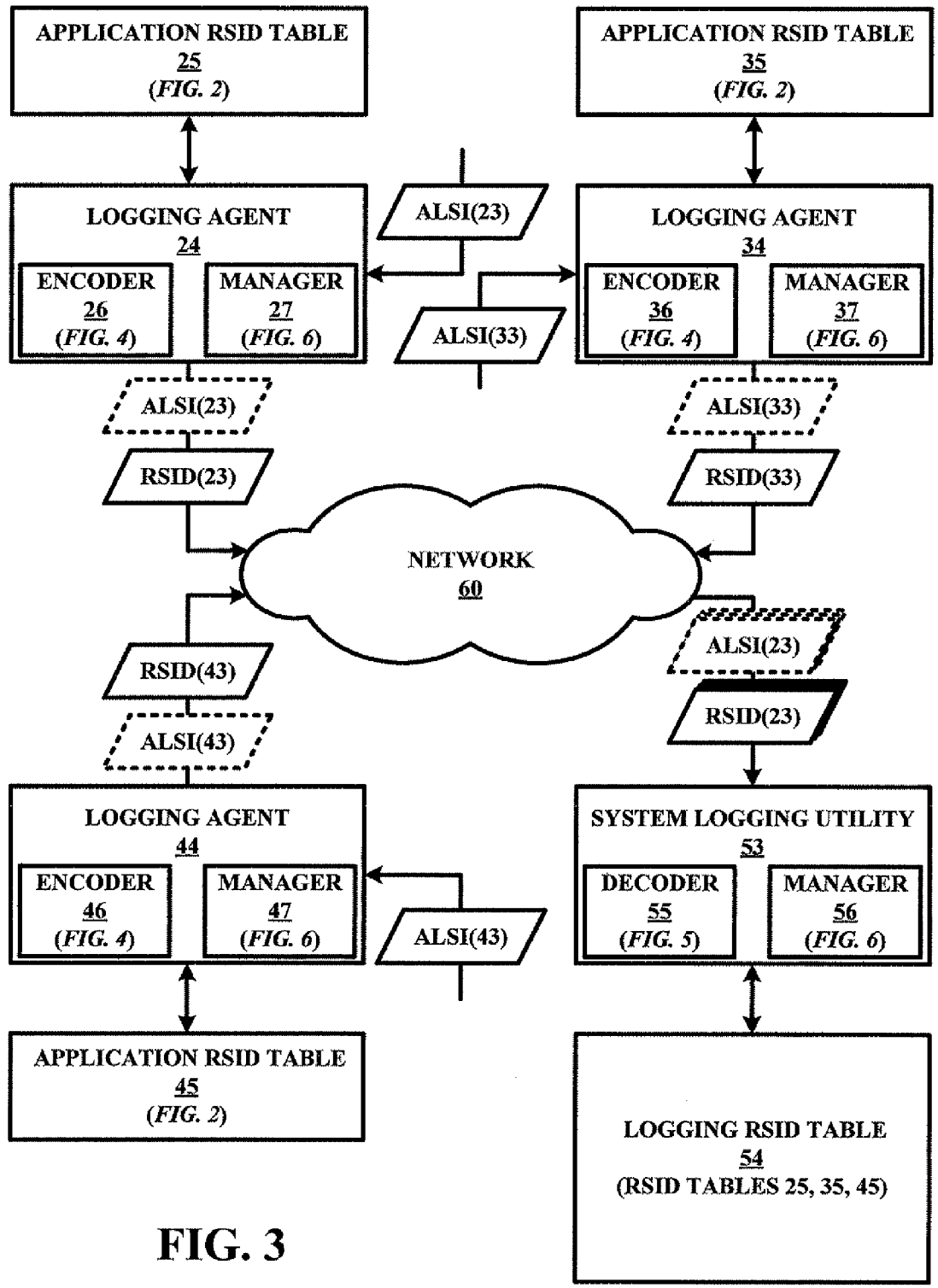
FIG. 3 illustrates an exemplary operation of the subsystem nodes illustrated in FIG. 1 in accordance with the present invention.

Specifically, as illustrated in FIG. 3, logging agent 24 will receive an application logging status information string ALSI (23) from a system application 23 (not shown) whereby logging agent 24 will transmit an associated reduced string identification encoding RSID(23) across network 60 to system logging utility 53 as an encoded representation of ALSI(23) that enables system logging utility 53 to perform logging operations on ALSI(23). Similarly, logging agent 34 will receive an application logging status information string ALSI (33) from a system application 33 (not shown) whereby logging agent 34 will transmit an associated reduced string identification encoding RSID(33) across network 60 to system logging utility 53 as an encoded representation of ALSI(33) that enables system logging utility 53 to perform logging operations on ALSI(33), and logging agent 44 will receive an application logging status information string ALSI(43) from a system application 43 (not shown) whereby logging agent 44 will transmit an associated reduced string identification encoding RSID(43) across network 60 to system logging utility 53 as an encoded representation of ALSI(43) that enables system logging utility 53 to perform logging operations on ALSI(43). In one embodiment, a RSID encoding is included within a RSID package that further includes protocol information necessary for a proper transfer of the RSID package across network 60 to system logging utility 54. As will be further explained herein, the RSID package may further include the corresponding ALSI string as shown by the dashed ALSI strings in FIG. 3.

The various inventive principles of the present invention for optimizing the transfer of a RSID across network 60 to system logging utility 53 are embodied in an encoder 26 and a manager 27 of logging agent 24, an encoder 36 and a manager 37 of logging agent 34, an encoder 46 and a manager 47 of logging agent 44, and a decoder 56 and a manager 57 of system logging utility 53. As will be further explained in connection with the following descriptions of FIGS. 4-7, these components provide (1) a logging status-information encoding and decoding algorithm based on RSID tables 25, 35, 45 and 54 to thereby optimize the transfer of application logging status information across network 60 to system logging utility 53; (2) an automated self-taught and self-enhanced management of RSID tables 25, 25, 45 to thereby further optimize the encoding/decoding algorithm; (3) a runtime and/or scheduled RSID table synchronization of RSID table 54 to recover any possible RSID damage or loss to thereby further optimize the encoding/decoding algorithm; and (4) a runtime and/or scheduled reduction in RSID table entry retrieval times to thereby further optimize the encoding/decoding algorithm.

Figure 4:
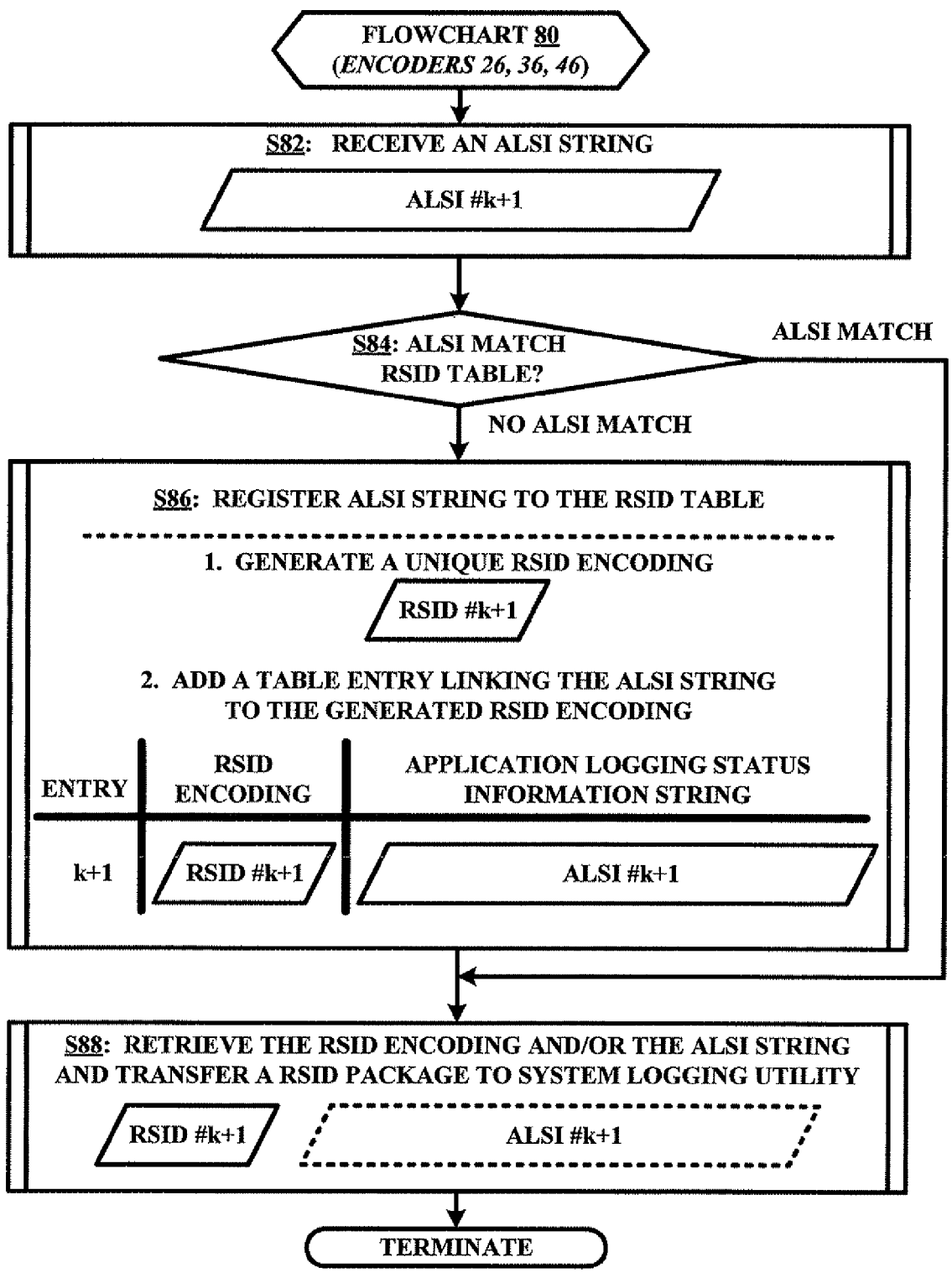
FIG. 4 illustrates a flowchart representative of one embodiment of a RSID encoding method in accordance with the present invention.

As illustrated in FIG. 4, a flowchart 80 representative of a RSID encoding method of the present invention is executed by encoders 26, 36, 46. To facilitate an understanding of flowchart 80, the following description of flowchart 80 will be provided in the context of application subsystem node 20 including encoder 26 processing a ALSI string in view of RSID table 25 having the form of RSID table 70 illustrated in FIG. 2.

A stage S82 of flowchart 80 encompasses encoder 26 receiving an ALSI string #k+1 from a system application 23, and a stage S84 of flowchart 80 encompasses encoder 26 determining if the ALSI string #k+1 is listed in RSID table 25. In view of the fact that ALSI string #k+1 is not listed in RSID table 25 as shown in FIG. 2, then encoder 26 proceeds to a stage S86 of flowchart 80 to register the ALSI string #k+1 to RSID table 25. In one embodiment of stage S86, encoder 26 generates a unique RSID encoding #k+1 and adds a table entry in RSID table 25 linking the ALSI string #k+1 to the generated RSID encoding #k+1. Thereafter, encoder 26 proceeds to a stage S88 of flowchart 80 to retrieve the RSID encoding #k+1 and ALSI string #k+1 from RSID table 25 and to transfer a RSID package including both RSID encoding #k+1 and ALSI string #k+1 as well as any other necessary transfer protocol information to system logging utility 53. As will be further explained in connection with the description of FIG. 5, the purpose of including both RSID encoding #k+1 and ALSI string #k+1 in the RSID package is to synchronize the registration of ALSI string #k+1 in both RSID table 25 and RSID table 54 of logging subsystem node 50.

If the received ALSI string of stage S82 had been determined by encoder 26 to be listed in RSID table 24 during stage S84, then encoder 26 would have proceeded to stage S88 to retrieve the RSID encoding #k+1 from RSID table 25 and to transfer a RSID package including RSID encoding #k+1 and excluding ALSI string #k+1 to system logging utility 53. The basis of including RSID encoding #k+1 in the RSID package and excluding ALSI string #k+1 from the RSID package is the assumption that RSID table 53 also lists a table entry of RSID encoding #k+1 of ALSI string #k+1. As will be further explained in connection with FIGS. 7 and 8, the present invention provides a synchronization of RSID tables 25 and 54 in the case where RSID table 54 does not list a table entry of RSID encoding #k+1 of ALSI string #k+1 upon receiving a RSID package including RSID encoding #k+1 and excluding ALSI string #k+1.

Furthermore, as will be further explained in connection with the description of FIG. 6, flowchart 80 is executable by encoders 26, 36, 46 irrespective as to whether or not a respective RSID table 25, 35, 45 is being built or updated in synchronization with RSID table 54 with the intention of the received ALSI string being processing by system logging utility 53.

Figure 5:
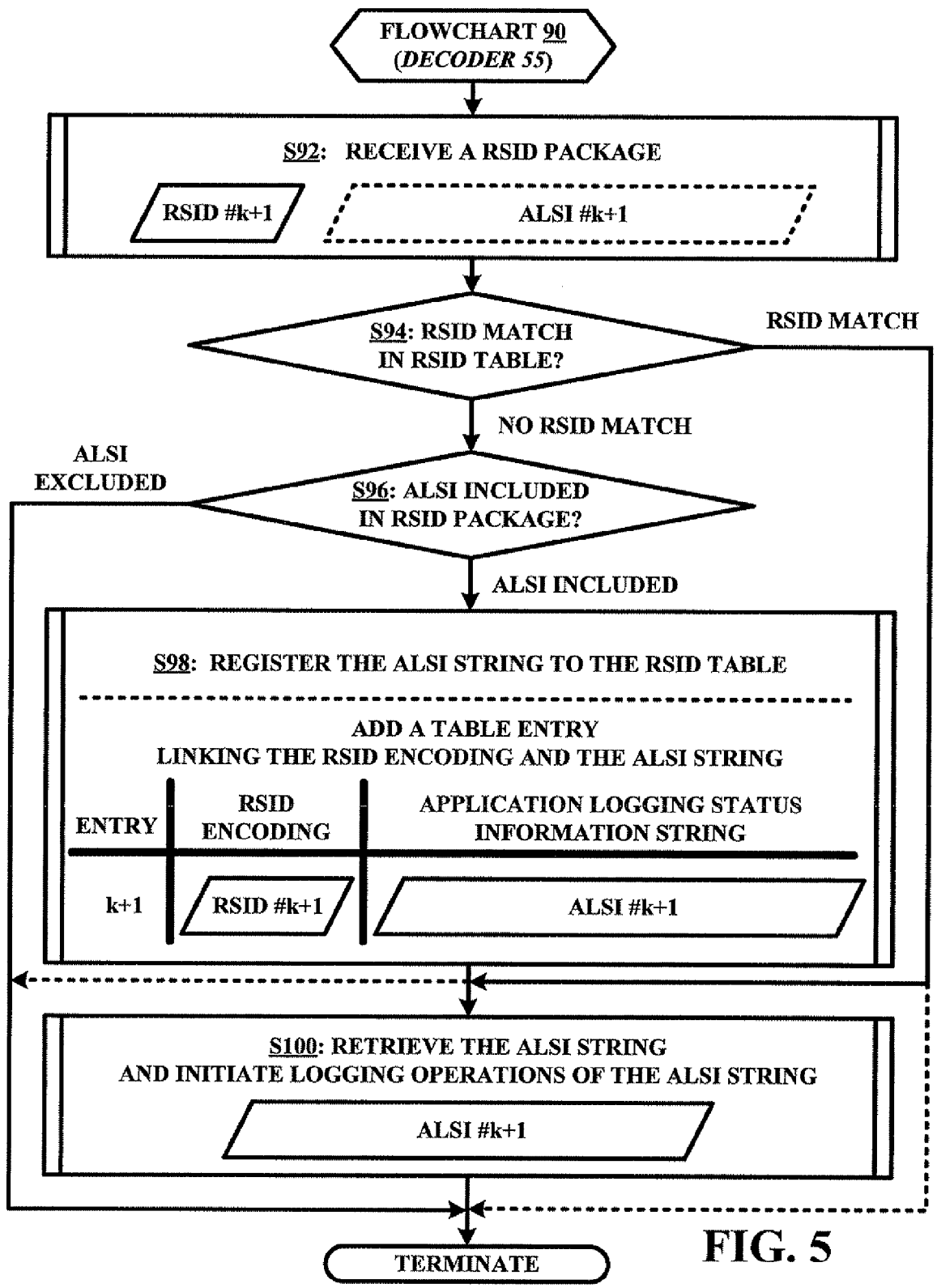
FIG. 5 illustrates a flowchart representative of one embodiment of a RSID decoding method in accordance with the present invention.

As illustrated in FIG. 5, a flowchart 90 representative of a RSID decoding method of the present invention is executed by decoder 55. To facilitate an understanding of flowchart 90, the following description of flowchart 90 will be provided in the context of logging subsystem node 50 including decoder 55 processing a RSID package from encoder 26 based on the previous description herein of FIG. 4 and in view of RSID table 54 having the form of RSID table 70 illustrated in FIG. 2.

A stage S92 of flowchart 90 encompasses decoder 55 receiving a RSID package from encoder 26 that includes both RSID encoding #k+1 and ALSI string #k+1, a stage S94 of flowchart 90 encompasses decoder 55 determining if the RSID encoding #k+1 is listed in RSID table 54 and if applicable, a stage S96 determines if the ALSI string #k+1 is included in the RSID package. In view of the fact that RSID encoding #k+1 is not listed in RSID table 54 and ALSI string #k+1 is included within the RSID package, then decoder 55 proceeds to a stage S98 of flowchart 90 to register ALSI string #k+1 in RSID table 54. In one embodiment of stage S98, decoder 55 adds a table entry in RSID table 54 linking the ALSI string #k+1 to the RSID encoding #k+1. Thereafter, decoder 55 proceeds to a stage S100 of flowchart 90 to retrieve ALSI string #k+1 from RSID table 54 to thereby initiate a logging operation of ALSI string #k+1 by system logging utility 53. The result of including both RSID encoding #k+1 and ALSI string #k+1 in the RSID package is the synchronization of the registration of ALSI string #k+1 in both RSID table 25 and RSID table 54 of logging subsystem node 50.

If RSID encoding #k+1 had been determined by decoder 55 to be listed in RSID table 54 during stage S94, then decoder 55 would have proceeded directly to stage S100 to retrieve to retrieve ALSI string #k+1 from RSID table 54 to thereby initiate a logging operation of ALSI string #k+1 by system logging utility 53.

Figure 6:
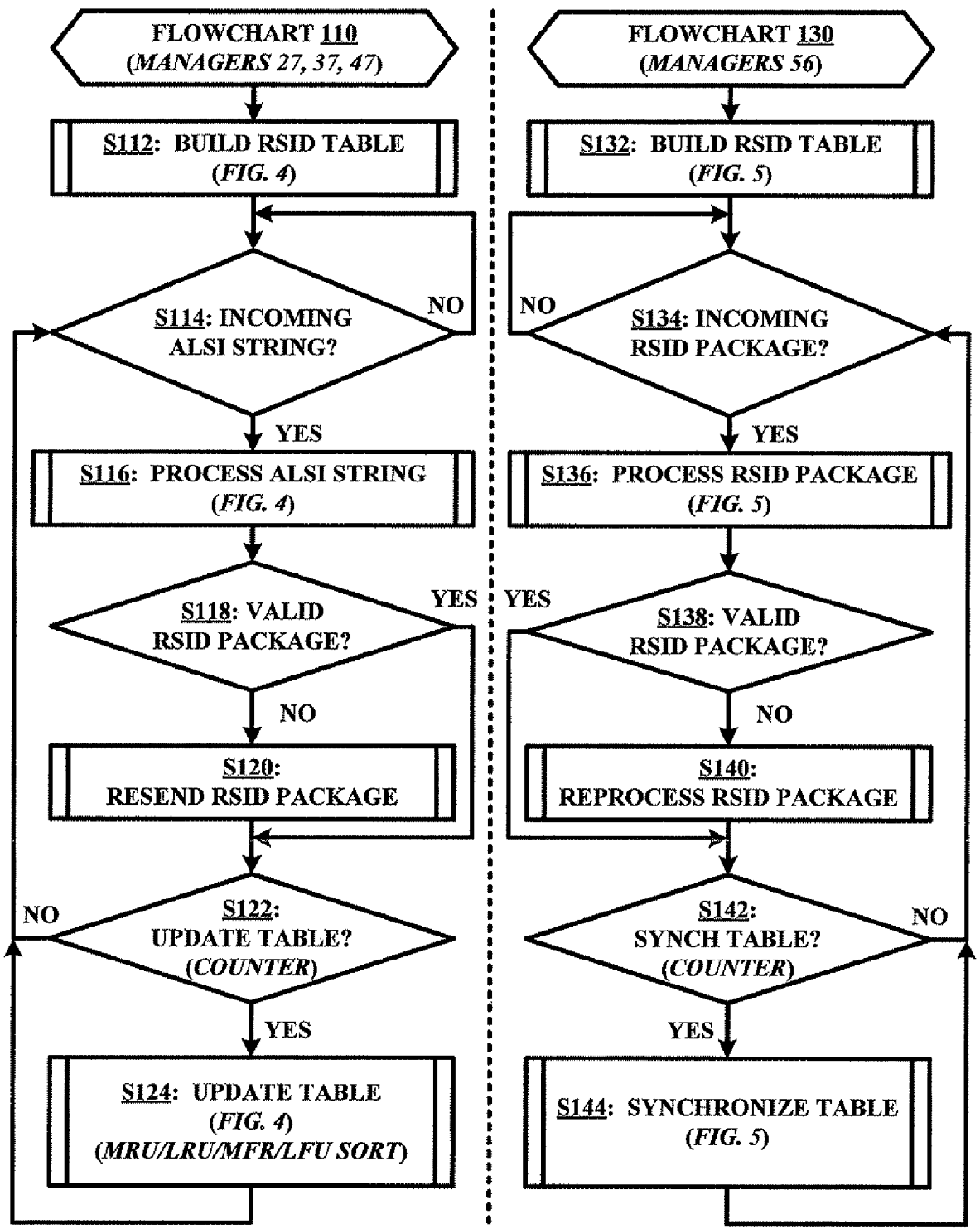
FIG. 6 illustrate flowcharts representative of one embodiment of a logging management method in accordance with the present invention.

If RSID encoding #k+1 had been determined by decoder 55 during stage S94 as not being listed in RSID table 54 and ALSI string #k+1 had been determined by decoder 55 during stage S96 to be excluded from the RSID package, then decoder 55 would have proceeded to terminate flowchart 90 whereby decoder 55 would inform encoder 26 that the received RSID package was invalid as will be further explained herein in connection with FIG. 6.

Furthermore, flowchart 90 is illustrated in the context of a logging of ALSI string #k+1 by system logging utility 53. However, as will be further explained in connection with the description of FIG. 6, if the RSID package was received by decoder 55 in the context of building or updating RSID table 54 without logging ALSI string #k+1, then decoder 55 would bypass stage S100 as shown by the dashed arrows from stages S94 and S98 bypassing stage S100.

Referring to FIGS. 3-5, flowcharts 80 and flowchart 90 serve as the basis for managers 27, 37, 47 and 56 managing the building/updating of respective RSID tables 25, 35, 45 as well as the transfer management of encoded application logging status information from respective application subsystem nodes 20, 30, 40 across network 60 to logging subsystem node 50. As illustrated in FIG. 6, a flowchart 110 representative of a logging management method of the present invention is executed by managers 27, 37, 47 and a flowchart 130 further representative of the logging method of the present invention is executed by manager 56. To facilitate an understanding of flowcharts 110 and 130, the following descriptions of flowcharts 110 and 130 will be provided in the context of manager 27 executing flowchart 110 and manager 56 executing flowchart 130.

A stage S112 of flowchart 110 encompasses manager 27 building RSID table 25, and a stage S132 of flowchart 130 encompasses manager 56 building RSID table 54. In one embodiment, stage S112 is initiated by manager 27 upon an initial installation of application subsystem node 20 whereby each system application 23 provides a definitive list of application logging status information strings with manager 27, which facilitates encoder 26 registering each application logging status information string of system application(s) 23 in RSID table 25 in accordance with stage S86 of flowchart 80 (FIG. 4) and further facilitates encoder 26 synchronizing the registration of each application logging information string of system application(s) 23 by manager 57 in RSID table 54 during a stage S132 of flowchart 130 in accordance with stage S98 of flowchart 90 (FIG. 5).

Upon completion of stages S112 and S132, manager 27 proceeds to a stage S114 of flowchart 110 to await an incoming ALSI string intended to be logged by system logging utility 53 and manager 56 proceeds to a stage S134 of flowchart 130 to await an incoming RSID package including a RSID encoding of the ALSI string intended to be logged by system logging utility 53. In response to an incoming ALSI string during stage S114, manager 27 provide the incoming ALSI string to encoder 26 for processing during a stage S116 of flowchart 110 in accordance with flowchart 80 (FIG. 4). The result is a transfer of a RSID package to logging subsystem node 50 whereby in response thereto manager 56 provides the RSID package to encoder 55 for processing during a stage S136 of flowchart 130 in accordance with flowchart 90 (FIG. 5).

During stage S136, the RSID package is deemed a valid package if the RSID encoding is already registered in RSID table 54 or the ALSI string is included in the RSID package. Conversely, the RSID package is deemed to be an invalid package is the RSID encoding is not already registered in RSID table 54 and the ALSI string is excluded from the RSID package. In the case of an invalid RSID package, manager 56 will return the RSID package to manager 27 during a stage S138 of flowchart 130 whereby manager 27 will determine during a stage S118 of flowchart 110 to resend a valid RSID package including both the RSID encoding and the ALSI string to manager 56 during a stage S120 of flowchart 110. Upon receiving the valid RSID package during stage S138, manager 56 will proceed to a stage S140 of flowchart 130 to provide the valid RSID package to encoder 55 for processing during a stage S140 of flowchart 130 in accordance with flowchart 90 (FIG. 5).

Figure 7:
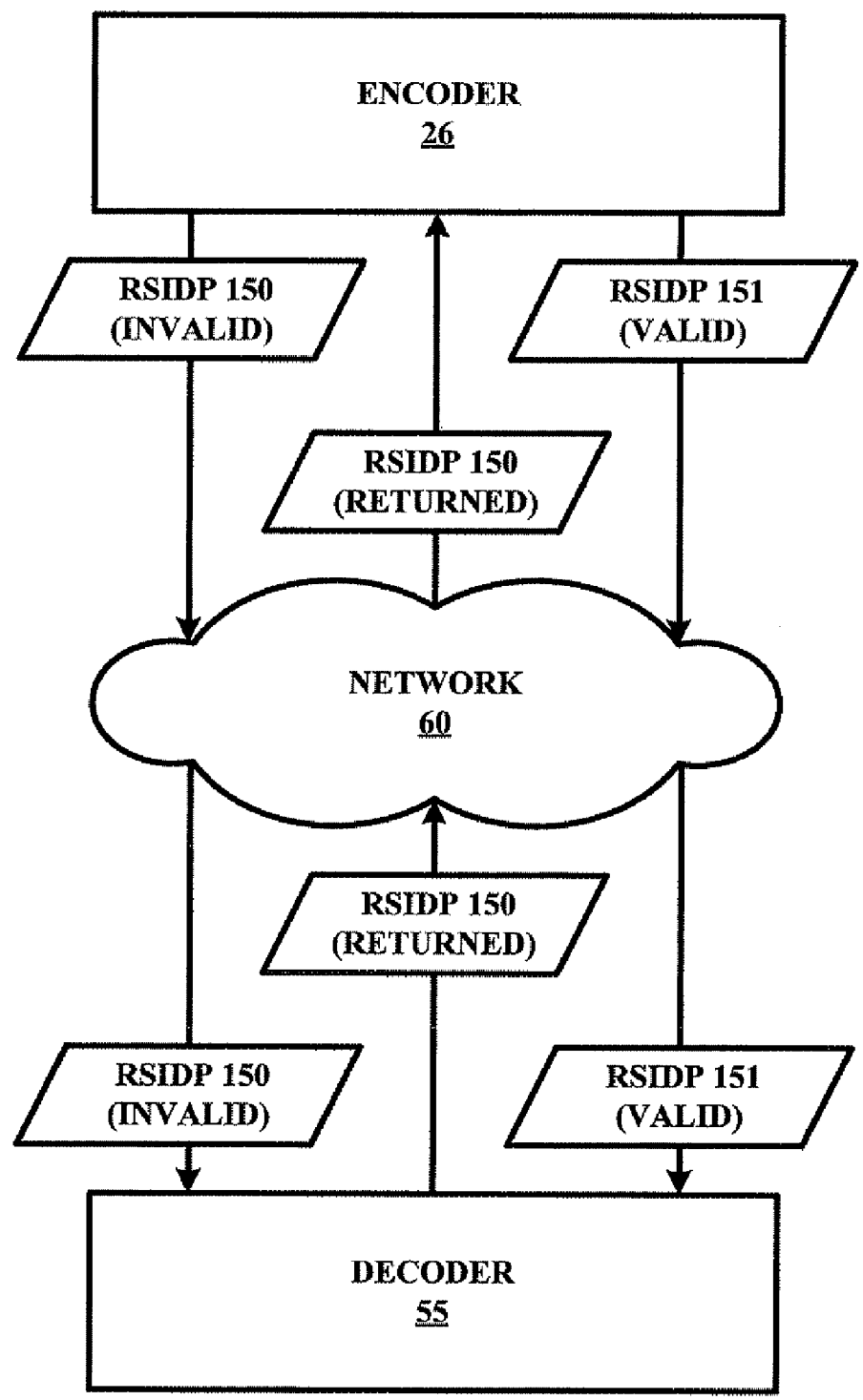
FIG. 7 illustrates an exemplary logging transfer in accordance with the present invention.

FIG. 7 further illustrates the synchronization of tables 25 and 54 based on stages S118, 120, 138 and 140. Specifically, if encoder 26 transfers an invalid RSID package 150 across network 160 to decoder 55 (i.e., the RSID encoding is excluded from the RSID package, or the RSID encoding is included in the RSID package but not registered with RSID table 54 or the ALSI string is excluded from the RSID package), then decoder 27 will return the invalid RSID package to encoder 26. In response thereto, encoder 26 will transfer a valid RSID package 151 across network 160 to decoder 55 (i.e., the RSID encoding is included in the RSID package and registered with RSID table 54, or the RSID encoding is included in the RSID package and unregistered with RSID table 54 and the ALSI string is included from the RSID package), then decoder 27 be able to synchronize RSID table 54 with a registration of the ALSI string and initiate the logging operation on the ALSI string by system logging utility 53.

Referring again to FIG. 6, upon completion of stage S120, manager 27 proceeds to a stage S122 of flowchart 120 to determine whether to update RSID table 25. In practice, the present invention does not impose any limitations or any restrictions as to the reason or reasons why an update of RSID table 25 may be required. In one embodiment of stage S122, an update of RSID table 25 is deemed necessary by manager 27 in view of a new system application has been added to application subsystem node 20. In a second embodiment of stage S122, manager 27 controls a counter that is increased upon each execution of stage S116 involving a registration of a new ALSI string whereby an update of RSID table 25 is deemed necessary by manager 27 in view of the counter exceeding a predefined threshold indicative of a specific number of ALSI registrations. In a third embodiment of stage S123, an update of RSID table 25 is deemed necessary by manager 27 in view of a scheduled sort of the RSID table in the form of a Most Recently Used ("MRU") sort or a Least Recently Used ("LRU") sort, and/or a Most Frequently Used ("MFU") sort or a Least Frequently Used ("LRU") sort.

If required, a stage S124 of flowchart 110 encompasses manager 27 managing the update of RSID table 27. In one embodiment of stage S124, manager 27 provides application logging status information strings of a newly installed system application 23 to encoder 26 for registration in RSID table 27 in accordance with stage S86 (FIG. 4). In a second embodiment of stage S124, provides application logging status information strings of each system application 23 to encoder 26 for registration in RSID table 27 in accordance with stage S86 (FIG. 4). In a third embodiment of stage S124, manager 27 performs a sort of RSID table 27. Upon completion of stage S124 of flowchart 110, manager 27 returns to stage S114 to await a ALSI string from a system application 23 that is intended to be logged by system logging utility 53.

Similarly, upon completion of stage S140, manager 56 proceeds to a stage S142 of flowchart 140 to determine whether to synchronize RSID table 54 with RSID table 27. In practice, the present invention does not impose any limitations or any restrictions as to the reason or reasons why a synchronization of RSID table 54 with RSID table 27 may be required. In one embodiment of stage S142, manager 56 controls a counter that is increased upon each execution of stage S136 involving a registration of a new RSID encoding and ALSI string whereby a synchronization of RSID table 54 with RSID table 27 is deemed necessary by manager 56 in view of the counter exceeding a predefined threshold indicative of a specific number of ALSI registrations related to all of the application subsystem nodes.

If required, a stage S144 of flowchart 110 encompasses manager 56 managing synchronization of RSID table 54 with RSID table 27. In one embodiment of stage S144, manager 56 requests manager 27 to provide all registered RSID encodings in RSID table 25 to decoder 55 whereby decoder 55 may register any unregistered RSID encodings in RSID table 54. Upon completion of stage S144 of flowchart 110, manager 56 returns to stage S134 to await a RSID package including a RSID encoding of a ALSI string that is intended to be logged by system logging utility 53.

While the transfer synchronization illustrated in FIG. 7 is described herein during the processing of a ALSI string intended to be logged by system logging utility, this transfer synchronization can be incorporated into stages S112 and S132 during a building of the RSID tables and/or into stages 124 and S144 during an update/synchronization of the RSID tables.

Referring to FIGS. 1-7, those having ordinary skill in the art will appreciate various benefits and advantages of the present invention, including, but not limited to, an optimized method to efficiently log application status information across multiple subsystem nodes.

Referring to FIG. 1, the term "processor" as used herein is broadly defined as one or more processing units of any type for performing all arithmetic and logical operations and decoding and executing all instructions related to facilitating an implementation by a subsystem of one or more of the various methods of the present invention. Additionally, the term "memory" as used herein is broadly defined as encompassing all storage space of any type within a subsystem node.

Referring to FIG. 1, a system of the present invention can have a X number of application subsystem nodes and a Y number of logging subsystem nodes, where X=1 and Y=1. From the description herein of the present invention, those having ordinary skill in the art of status information logging techniques will appreciate how to apply the inventive principles of the present invention to systems that are more or less complex than the 3 application subsystem node/1 logging subsystem node shown in FIG. 1.

Referring to FIG. 3, each encoder and manager of application subsystem node 20, 30, 40 can be segregated as shown or integrated in whole or in part. Similarly, decoder 55 and manager 56 of logging subsystem node 50 can be segregated as shown or integrated in whole or in part.

Furthermore, those having ordinary skill in the art of status information logging techniques may develop other embodiments of the present invention in view of the inventive principles of the present invention described herein. Thus, the terms and expression which have been employed in the foregoing specification are used herein as terms of description and not of limitations, and there is no intention in the use of such terms and expressions of excluding equivalents of the features shown and described or portions thereof, it being recognized that the scope of the present invention is defined and limited only by the claims which follow.

We claim:

1. A method of operating a system including an application subsystem node having an application RSID table and a logging subsystem node having a logging RSID table, the method comprising:

a determination by the application subsystem node of a registration status of a ALSI string relative to the application RSID table; and a transferring of a RSID package from the application subsystem node across a network to the logging subsystem node, wherein the RSID package includes a RSID encoding of the ALSI string and conditionally includes the ALSI string based on the registration status of the ALSI string relative to the application RSID table as determined by the application subsystem node.

2. The method of claim 1, further comprising:
a generation of the RSID encoding by the application subsystem node in response to the ALSI string being unregistered in the application RSID table; and
an addition of a table entry by the application subsystem node in the application RSID table, wherein the table entry links the RSID encoding as generated by the application subsystem node to the ALSI string.

3. The method of claim 2, wherein the ALSI is included in the RSID package in response to the addition of the table entry by the application subsystem node in the application RSID table.

4. The method of claim 1, further comprising:
a determination by the logging subsystem node of an inclusion status of the RSID encoding relative to the RSID package in response to the logging subsystem node receiving the RSID package; and
a returning of the RSID package from the logging subsystem node across the network to the application subsystem node in response to the RSID encoding being excluded from the RSID package as received by the logging subsystem node.

5. The method of claim 1, further comprising:
a determination by the logging subsystem node of a registration status of the RSID encoding relative to the logging RSID table in response to the logging subsystem node receiving the RSID package including the RSID encoding; and
conditionally registering the RSID encoding based on the registration status of the RSID encoding relative to the logging RSID table.

6. The method of claim 5, further comprising:
a determination by the logging subsystem node of an inclusion status of the ALSI string relative to the RSID package in response to the RSID encoding being unregistered with the logging RSID table; and
a registration by the logging subsystem node of the ALSI string and RSID encoding in the logging RSID table in response to the ALSI string being included in the RSID package as received by the logging subsystem node.

7. The method of claim 5, further comprising:
a determination by the logging subsystem node of an inclusion status of the ALSI string relative to the RSID package in response to the RSID encoding being unregistered with the logging RSID table; and
a returning of the RSID package from the logging subsystem node across the network to the application subsystem node in response to the ALSI being excluded from the RSID package as received by the logging subsystem node.

8. A system, comprising:
a logging subsystem node; and
an application subsystem node including a first processor and a first memory operable with the first processor for executing a first set of instructions executed for:
a determination by the application subsystem node of a registration status of a ALSI string relative to an application RSID table; and
a transferring of a RSID package from the application subsystem node across a network to the logging subsystem node, wherein the RSID package includes a RSID encoding of the ALSI string and conditionally includes the ALSI string based on the registration status of the ALSI string relative to the application RSID table as determined by the application subsystem node.

9. The system of claim 8, where the first set of instructions are further executed:
a generation of the RSID encoding by the application subsystem node in response to the ALSI string being unregistered in the application RSID table; and
an addition of a table entry by the application subsystem node in the application RSID table, wherein the table entry links the RSID encoding as generated by the application subsystem node to the ALSI string.

10. The system of claim 9, wherein the ALSI is included in the RSID package in response to the addition of the table entry by the application subsystem node in the application RSID table.

11. The system of claim 8, wherein the logging subsystem node includes a second processor and a second memory operable with the second processor for executing a second set of instructions executed for:
a determination by the logging subsystem node of an inclusion status of the RSID encoding relative to the RSID package in response to the logging subsystem node receiving the RSID package; and
a returning of the RSID package from the logging subsystem node across the network to the application subsystem node in response to the RSID encoding being excluded from the RSID package as received by the logging subsystem node.

12. The system of claim 11, wherein the logging subsystem node includes a second processor and a second memory operable with the second processor for executing a second set of instructions executed for:
a determination by the logging subsystem node of a registration status of the RSID encoding relative to a logging RSID table in response to the logging subsystem node receiving the RSID package including the RSID encoding; and
conditionally registering the RSID encoding based on the registration status of the RSID encoding relative to the logging RSID table.

13. The system of claim 12, wherein the second set of instructions are further executed for:
a determination by the logging subsystem node of an inclusion status of the ALSI string relative to the RSID package in response to the RSID encoding being unregistered with the logging RSID table; and
a registration by the logging subsystem node of the ALSI string and RSID encoding in the logging RSID table in response to the ALSI string being included in the RSID package as received by the logging subsystem node.

14. The system of claim 12, wherein the second set of instructions are further executed for:
a determination by the logging subsystem node of an inclusion status of the ALSI string relative to the RSID package in response to the RSID encoding being unregistered with the logging RSID table; and
a returning of the RSID package from the logging subsystem node across the network to the application subsystem node in response to the ALSI being excluded from the RSID package as received by the logging subsystem node.

15. A system, comprising:
a logging subsystem node; and
an application subsystem node having a first processor and a first memory including a logging agent and an application RSID table, wherein the first processor executes the logging agent to execute:

a determination by the application subsystem node of a registration status of a ALSI string relative to the application RSID table; and a transferring of a RSID package from the application subsystem node across a network to the logging subsystem node, wherein the RSID package includes a RSID encoding of the ALSI string and conditionally includes the ALSI string based on the registration status of the ALSI string relative to the application RSID table as determined by the application subsystem node.

16. The system of claim 15, wherein the logging agent is further operable to execute:

a generation of the RSID encoding by the application subsystem node in response to the ALSI string being unregistered in the application RSID table; and an addition of a table entry by the application subsystem node in the application RSID table, wherein the table entry links the RSID encoding as generated by the application subsystem node to the ALSI string.

17. The system of claim 16, wherein the ALSI is included in the RSID package in response to the addition of the table entry by the application subsystem node in the application RSID table.

18. The system of claim 15, wherein the logging subsystem node includes a second processor and a second memory including a system logging utility and a logging RSID table, wherein the system logging utility is executed by the second processor to execute:

a determination by the logging subsystem node of an inclusion status of the RSID encoding relative to the RSID package in response to the logging subsystem node receiving the RSID package; and a returning of the RSID package from the logging subsystem node across the network to the application subsystem node in response to the RSID encoding being excluded from the RSID package as received by the logging subsystem node.

19. The system of claim 15, wherein the logging subsystem node first memory includes a system logging utility and a logging RSID table, the system logging utility being operable to execute:

a determination by the logging subsystem node of a registration status of the RSID encoding relative to the logging RSID table in response to the logging subsystem node receiving the RSID package including the RSID encoding; and conditionally registering the RSID encoding based on the registration status of the RSID encoding relative to the logging RSID table.

20. The system of claim 19, wherein the system logging utility is further operable to execute:

a determination by the logging subsystem node of an inclusion status of the ALSI string relative to the RSID package in response to the RSID encoding being unregistered with the logging RSID table; and a registration by the logging subsystem node of the ALSI string and RSID encoding in the logging RSID table in response to the ALSI string being included in the RSID package as received by the logging subsystem node.

21. The system of claim 19, wherein the system logging utility is further operable to execute:

a determination by the logging subsystem node of an inclusion status of the ALSI string relative to the RSID package in response to the RSID encoding being unregistered with the logging RSID table; and a returning of the RSID package from the logging subsystem node across the network to the application subsystem node in response to the ALSI being excluded from the RSID package as received by the logging subsystem node.

* * * * *